United States Patent Office 2,966,931
Patented Jan. 3, 1961

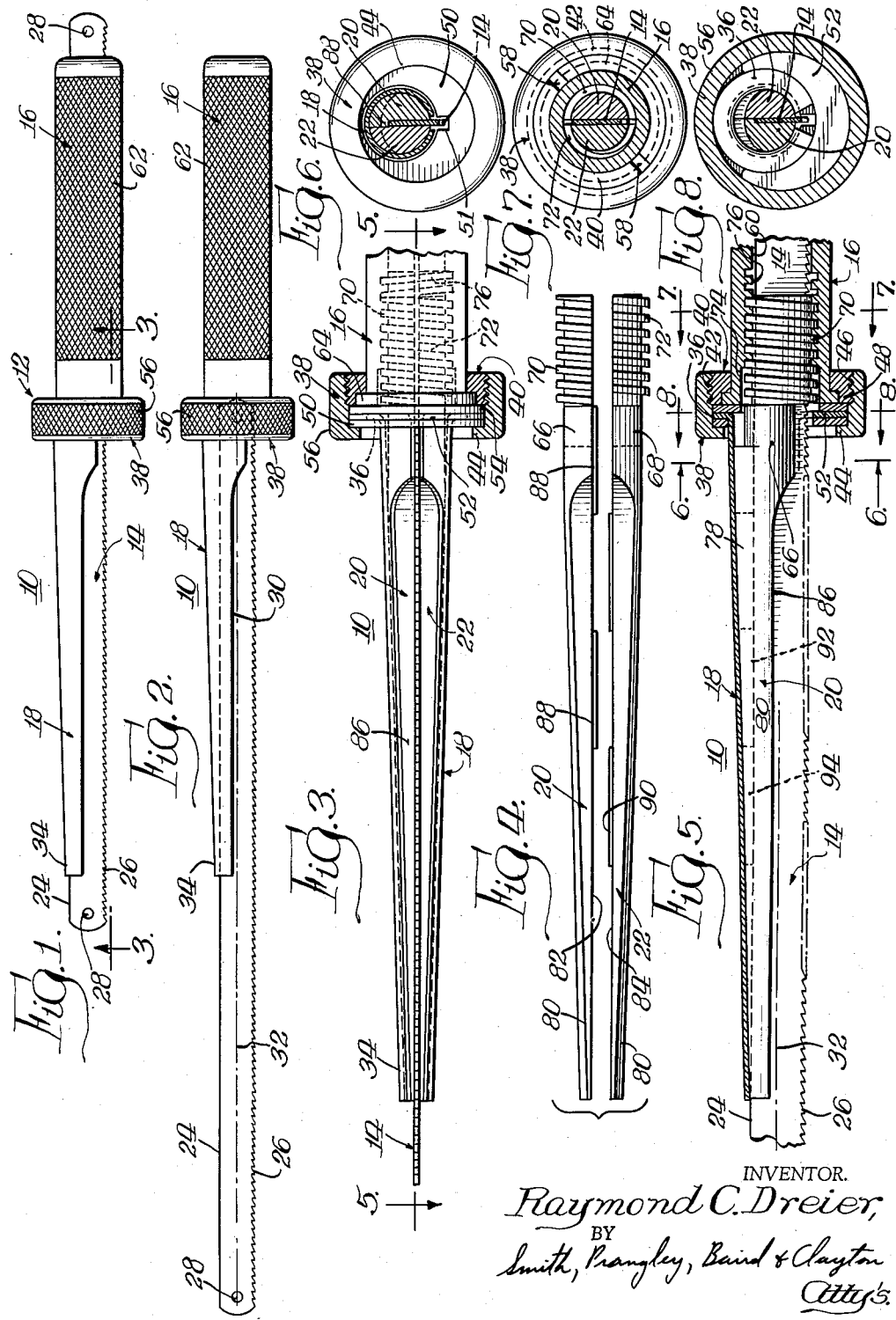

2,966,931
HAND SAW STRUCTURE
Raymond C. Dreier, 6930 South Shore Drive, Chicago, Ill.

Filed Jan. 10, 1958, Ser. No. 708,172

5 Claims. (Cl. 145—31)

This invention relates to improvements in saws, and particularly to improvements in saws which, broadly speaking, may be considered to be of the keyhole type.

Keyhole type saws have been provided heretofore for cutting in confined places, but the prior saws of this general type have possessed certain limitations. For example, the saw blades of the prior saws, in general, have not been supported along any substantial length thereof. As a result, the blade has been either too flexible for certain applications or has been made sufficiently stiff and heavy in construction so that it could not be used in certain other applications. These prior saws also have in general required special blades and the blades have not been such as to be readily changed for adjustment or replacement.

Accordingly, it is an important object of the present invention to provide a highly improved saw of the saber or keyhole type.

Another object of the invention is to provide an improved saw of the type set forth in which the saw blade may be readily adjusted to provide a substantially flexible condition, or adjusted to provide a substantially inflexible condition.

In connection with the foregoing object it is another object of the invention to provide a saw of the type set forth which can use an ordinary hack saw blade to provide a cutting edge.

Yet another object of the invention is to provide an improved saw and holder therefor which can reach into a small hole, for example on the order of ¾ inch, while the cutting blade is rigidly supported throughout substantially the entire cutting length thereof.

Still another object of the invention is to provide an improved saw of the type set forth in which the cutting blade can be extended beyond the holder therefor to provide a free, relatively flexible blade section for cutting in narrow slots such as saw slots and similar confined areas.

Yet another object of the invention is to provide an improved saw blade holder embodying therein a vise type mounting for the blade, by which the blade can be held with the cutting edge thereof rigid and wherein the blade can be quickly extended to provide an unsupported flexible blade section.

In conjunction with the foregoing object it is a further object of the invention to provide a vise type mounting for the cutting blade in which the blade can be quickly changed and in which only a piece of a blade, such as a piece of a hack saw blade, can be satisfactorily used as the cutting blade member.

These and other objects and advantages of the present invention will be better understood from the following description, taken in conjunction with the accompanying drawing. In the drawing, wherein like reference numerals have been utilized to designate like parts throughout:

Fig. 1 is a side elevational view of a keyhole type saw constructed in accordance with and embodying the principles of the present invention, the saw blade being shown in a relatively retracted position wherein it is supported in a rigid manner throughout substantially the entire exposed cutting portion thereof;

Fig. 2 is a view similar to Fig. 1, but showing the saw blade in an extended position to provide at the outer end of the blade a substantial unsupported and flexible cutting section;

Fig. 3 is an enlarged bottom view of the saw of Fig. 1, with certain portions broken away substantially as seen in the direction of the arrows along the line 3—3 of Fig. 1;

Fig. 4 is an exploded view of the vise jaws forming a part of the saw blade holder of Figs. 1, 2 and 3;

Fig. 5 is a view in longitudinal vertical section through the saw taken substantially along the line 5—5 of Fig. 3;

Fig. 6 is a view in transverse section through the sheath and jaws of the saw blade holder, substantially as seen in the direction of the arrows along the line 6—6 of Fig. 5;

Fig. 7 is a transverse section taken through the handle, substantially as seen in the direction of the arrows along the line 7—7 of Fig. 5; and Fig. 8 is a view in transverse section taken through the structure interconnecting the handle and the sheath, substantially as seen in the direction of the arrows along the line 8—8 of Fig. 5.

The saw 10 illustrated in the drawing includes, in general, a saw blade holder 12 which receives therein and suitably supports a cutting blade, such as an ordinary hack saw blade 14. The holder 12, in turn, includes a handle 16 which is rotatably mounted upon and connected to a wedging member or tapered sheath 18, within which is mounted and positioned a pair of clamping jaws 20 and 22.

The hack saw blade 14 shown in the drawing may be of the standard construction formed of a suitable cutting steel shaped to provide a longitudinally extending substantially straight upper edge 24 and a longitudinally extending lower cutting edge 26 having a plurality of cutting teeth thereon. The usual apertures 28 are shown to be provided in the opposite ends of the blade 14, but these apertures are not utilized in the present invention. On the contrary, in the present saw the blade 14 is supported along the body thereof by the jaws 20 and 22 which are urged toward each other to clamp the blade 14 therebetween by the action of the wedging member or sheath 18. Preferably, the sheath 18 is formed of a durable steel and may have a substantially uniform thickness throughout. As may be best seen in Fig. 6 of the drawing, the end of the sheath 18 disposed adjacent to the handle 16 is substantially circular in cross section but is provided with a slot in the lower portion thereof which receives the saw blade 14 therethrough. The sheath 18 tapers substantially uniformly from the end disposed toward the handle 16 toward the free end thereof, as may be best seen in Fig. 3 of the drawing. Furthermore, the lower edges of the sheath 18 are relieved upwardly to provide lower edges 30 which are disposed above the center line of the handle 16 and the blade 24 throughout most of their length, the center line being indicated as a broken line in Fig. 2 and designated by the numeral 32. The inner conical surface of the sheath 18 also tapers toward the free end 34 thereof whereby to form converging wedging surfaces which react against the jaws 20 and 22 to force the jaws toward each other, as will be more fully explained hereinafter.

The sheath 18 and the handle 16 are interconnected by an assembly which is best illustrated in Figs. 3 and 5 of the drawing. The end of the sheath 18 disposed adjacent to the handle 16 is provided with an outwardly directed integral flange 36. This flange is received within the assembly which includes an outer clamping ring, generally designated by the numeral 38, and an inner clamping ring generally designated by the numeral 40. The outer clamping ring is substantially annular in shape and is provided adjacent to one end thereof with an internal threaded section 42. The other end of the ring 38 is provided with an integral inturned flange 44 having an aperture in the center thereof through which extend the sheath 18 and the clamping jaws 20 and 22. The inner clamping ring 40 is also annular in construction and is provided with an outer threaded section 46 which is received in and mates with the threaded section 42 on the ring 38. A shoulder 48 of the ring 40 is disposed opposite the flange 44 on the outer ring 38 whereby to permit clamping of members therebetween.

As is best seen in Figs. 3 and 5 of the drawing the outturned flange 36 on the sheath 18 is disposed between the flange 44 of the outer clamping ring 38 and the shoulder 48 of the ring 40. There is further provided between the flange 36 and the flange 44 a ring 50 which has a generally circular outer periphery and which is received within the outer ring 38 and bears against the flange 44 thereof. There is formed in the ring 50 an opening to receive therethrough the sheath 18 and a portion of the jaws 20 and 22, and this opening has a small slot 51 extending radially therefrom to provide clearance for the blade 14 (Fig. 6). The flange 36 on the sheath 18 has a diameter substantially less than the inner diameter of the outer ring 38 and is positioned upwardly in an off-center location therein, as viewed in Fig. 8. The major portion of the space within the ring 38 not filled by the flange 36 is occupied by a filler washer 52 which insures that the flange 36, and thus the sheath 18, will always occupy its off-center location within the ring 38, as shown in Fig. 8. Disposed between the flange 36 and the shoulder 48 of the inner ring 40 is a retaining washer 54 which is annular in form.

The slotted ring 50, the flange 36, the filler washer 52 and the retaining washer 54 are all clamped between the shoulder 48 on the inner clamping ring 40 and the flange 44 on the outer clamping ring 38. The rings 38 and 40 can thus be tightened firmly to clamp these parts together and, to this end, the outer surface 56 of the outer ring 38 is knurled and the exposed face of the inner clamping ring 40 is provided with a pair of slots 58 to receive a spanner wrench for tightening purposes.

The handle 16 is cylindrical in form and is provided with a longitudinally extending aperture 60 therein which extends the entire length thereof. For convenience, a portion of the outer surface 62 of the handle 16 is also knurled for a purpose which will be more fully understood hereinafter. The end of the handle 16 disposed toward the sheath 18 is provided with an outwardly directed flange 64 which is rotatably retained between the retaining washer 54 and the inner clamping ring 40 in an annular recess provided in the ring 40 for this purpose. The handle 16 is therefore free to rotate with respect to the sheath 18 and also with respect to the clamping rings 38 and 40 and associated parts.

The construction of the clamping jaws 20 and 22 can be best understood by reference to Figs. 4 and 5 of the drawing. The right hand ends 66 and 68 of the jaws 20 and 22, as viewed in Figs. 3 to 5, are formed substantially semi-cylindrical in cross section and are provided with external threaded sections 70 and 72, respectively. The threaded sections 70 and 72 are received within the adjacent end of the handle 16 where they are engaged by internal threads 76 formed on the interior of the aperture 60 of the handle, this aperture being counter-bored at its innermost end, as seen at 74.

To the left of the end sections 66 and 68 of the jaws, the jaws 20 and 22 extend upwardly, as illustrated in Fig. 5, to contact the inner surface of the sheath 18 and are shaped generally to conform thereto. For example, the portion 78 of the jaw 20 extends upwardly and contacts the inner wedging surface of the sheath 18 and further is provided with a cooperating bearing surface 80 which tapers in substantially the same manner and to the same degree as do the inner wedging surfaces of the sheath 18. The jaw 22 is provided with similar bearing surfaces and is similarly shaped. Accordingly, longitudinal movement of the jaws 20 and 22 to the left, as viewed in Figs. 1 through 5, will cause the jaws 20 and 22 to be moved toward each other in a clamping manner.

The jaws 20 and 22 are provided with inwardly facing substantially parallel surfaces 82 and 84 which provide clamping surfaces to grip the opposite sides of the hack saw blade 14, the wedging movement of the jaws 20 and 22 described above forcing the surfaces 82 and 84 toward each other to provide the clamping action. The lower surfaces of the jaws 20 and 22, as viewed in Fig. 5, are relieved upwardly adjacent to the portions 66 and 68 thereof to provide a lowermost surface 86 which lies above the center line or longitudinal axis of the handle 16 and the hack saw blade 14. Accordingly, the surfaces 82 and 84 grip the blade 14 only adjacent to the upper straight edge 24 thereof.

In order properly to position the upper edge 24 of the saw blade 14 in the jaws, a plurality of guides 88 is provided on the jaw 20 and a similar set of guides 90 is provided on the jaw 22. As is best seen in Fig. 4 of the drawing, the guides 88 and 90 are spaced apart and alternate. The transverse dimension of the guides 88 and 90 (Fig. 4) is preferably less than the thickness of the saw blade 14 to insure that the surfaces 82 and 84 of the jaws will engage and grip the surfaces of the blade 14. The lower edges 92 and 94 of the guides 88 and 90 (Fig. 5) are arranged in general alignment and are adapted to be contacted by the upper edge 24 of the blade 14 as the blade is inserted between the jaws, thereby insuring that the blade will be properly oriented with respect to the vertical.

In order to place the blade 14 in the holder 12, the operator grips the handle 16 in one hand and the knurled surface 56 of the ring 38 in the other hand. These parts are then rotated relative to each other in a direction to withdraw the jaws 20 and 22 toward the right as viewed in the drawing and into the handle 16. This action will cause a slight separation of the jaws 20 and 22 as a result of withdrawing the bearing surfaces 80 on the jaws from forceful engagement with the wedging surfaces on the sheath 18. For convenience, the holder 12 may then be inverted so that it assumes the position illustrated in Fig. 3. The hack saw blade 14 may then be conveniently inserted between the jaws, with the straight edge 24 of the blade positioned downwardly and the cutting edge 26 positioned upwardly. It is to be noted that the guides 88 and 90 will engage and support the edge 24 during this insertion of the blade, thereby automatically properly positioning the edge 24 with respect to the jaws 20 and 22. The user may then position the blade longitudinally between the jaws, either as illustrated in Fig. 1 or in Fig. 2 or in some intermediate position.

When the blade has been positioned between the jaws, the handle 16 is turned with respect to the ring 38 and associated parts, whereby to advance the jaws 20 and 22 out of the handle 16 and to the left as viewed in Figs. 1 to 5 of the drawing. This will cause the bearing surfaces 80 to engage the wedging surfaces on the sheath 18 and thus force the jaws, and particularly the clamping surfaces 82 and 84 thereof, toward the blade 14. As a result, the blade 14 will be firmly clamped between the jaws and held along a portion thereof adjacent to the longitudinal straight upper edge 24 thereof.

During the tightening movement of the parts, the blade 14 will engage an edge of the slot 51 in the ring 50 to prevent rotation of the jaws and blade with respect to the sheath 18.

It will be noted that a piece of a blade 14 may be used in the present saw structure in place of the entire blade. It has been found that even very short pieces having a length less than the length of the jaws 20 and 24 can be advantageously used in the present invention.

With the blade 14 mounted as illustrated in Fig. 1 of the drawing, the saw 10 can be used as a saber saw or as a keyhole saw. The dimensions of the parts may be chosen so that the end of the saw can readily reach into and work within a hole having a diameter as small as 3/4 inch or less. Work in such confined places is achieved while supporting the edge 24 of the saw along a substantial portion of the length thereof. In certain instances, on the other hand, it is desirable to work with the blade 14 extended, as is illustrated in Fig. 2 of the drawing. For example, if the workman were to strike a hidden nail while sawing with a hand wood saw, the nail can advantageously be sawed through by the present saw by extending the blade, as illustrated in Fig. 2, and inserting the blade into the saw slot. In general, the extended blade can be used in any confined area or slot big enough to receive the blade 14 itself.

Another advantage of the extended blade position in the present saw, as illustrated in Fig. 2, is the fact that the portion of the blade 14 disposed beyond the small end of the jaws 20 and 22 is substantially flexible. This can be particularly useful in cutting parts in a flush manner, as for example, bolts, nails and the like.

Because of the simple action of the blade holder 12, the blade 14 can be readily inserted therein and adjusted with respect thereto. Blades can be readily changed as well as having the position thereof adjusted with respect to the handle 12.

It will be seen that there has been provided an improved saw of the saber or keyhole type and particularly a saw blade holder which fulfills all of the objects and advantages set forth above. Although one preferred form of the invention has been shown and described for purposes of illustration, it is to be understood that various changes and modifications may be made therein without departing from the spirit and scope of the invention. Accordingly, the invention is to be limited only as set forth in the following claims.

I claim:

1. A hand saw including a frame and an elongated saw blzade having cutting teeth on one longitudinally extending edge thereof, said frame comprising an elongated wedge member having elongated longitudinally extending wedging surfaces, a pair of elongated clamping jaws mounted adjacent to said wedge member for relative movement longitudinally thereof, said jaws having elongated bearing surfaces engaging said wedging surfaces and spaced apart elongated clamping surfaces to engage and to grip therebetween a substantial longitudinally extending portion of the saw blade along the longitudinally extending edge thereof opposite the cutting teeth, both wedging surfaces and said bearing surfaces being tapered toward the corresponding free ends thereof, and mechanism mounted on said wedge member to move said jaws longitudinally of said wedge member and toward said free end to force said bearing surfaces against said wedging surfaces to move said clamping surfaces toward each other and to clamp the saw blade therebetween along the longitudinally extending edge of the saw blade opposite the cutting teeth, whereby the portion of the length of the saw blade clamped by said jaws is held rigid and the associated cutting teeth are exposed for cutting purposes and are held in the proper alignment during use.

2. A handsaw including a holder and an elongated saw blade having cutting teeth on one longitudinally extending edge thereof, said holder comprising an elongated wedge member having elongated longitudinally extending wedging surfaces, a pair of elongated clamping jaws mounted adjacent to said wedge member for relative movement longitudinally thereof, said jaws having elongated bearing surfaces engaging said wedging surfaces and spaced apart elongated clamping surfaces to engage and to grip therebetween a substantial longitudinally extending portion of the saw blade along the longitudinally extending edge thereof opposite the cutting teeth, said jaws being shaped to cover less than one half of the width of said saw blade for a substantial distance therealong, and mechanism mounted on said wedge member to move said jaws longitudinally of said wedge member to force said bearing surfaces against said wedging surfaces to move said clamping surfaces toward each other and to clamp the saw blade therebetween along the longitudinally extending edge of the saw blade opposite the cutting teeth, whereby the portion of the length of the saw blade clamped by said jaws is held rigid and the associated cutting teeth are exposed for cutting purposes and are held in proper alignment during use.

3. A handsaw including a holder and an elongated saw blade having cutting teeth on a first longitudinally extending edge thereof, said holder comprising an elongated wedge member having longitudinally extending elongated wedging surfaces thereon, a pair of elongated clamping jaws mounted adjacent to said wedge member for relative movement longitudinally thereof, said jaws having elongated bearing surfaces engaging said wedging surfaces and having spaced apart elongated clamping surfaces to engage and to grip therebetween a substantial longitudinally extending portion of the saw blade along the longitudinally extending edge thereof opposite the first edge, a hollow handle mounted on said wedge member and having an aperture therethrough for receiving at least a part of the length of the saw blade therein, and mechanism including said handle to move said jaws longitudinally of said wedge member to force said bearing surfaces against said wedging surfaces to clamp the saw blade between said clamping surfaces along the longitudinally extending edge of the saw blade opposite the cutting teeth, whereby the portion of the length of the saw blade clamped by said jaws is held rigid and the associated cutting teeth are exposed for cutting purposes and are held in proper alignment during use.

4. A handsaw including a holder and an elongated saw blade having cutting teeth on a first longitudinally extending edge thereof, said holder comprising an elongated wedge member having longitudinally extending elongated wedging surfaces thereon, a pair of elongated clamping jaws mounted adjacent to said wedge member for relative movement longitudinally thereof, said jaws having elongated bearing surfaces engaging said wedging surfaces and having spaced apart elongated clamping surfaces to engage and to grip therebetween a substantial longitudinally extending portion of the saw blade along the longitudinally extending edge thereof opposite the first edge, a handle rotatably mounted on said wedge member and having a threaded aperture therein, thread sections on said jaws extending into said handle and threadedly engaging the aperture therein, whereby rotation of said handle with respect to said wedge member in one direction will move said jaws into wedging engagement with said wedge member to clamp the saw blade therebetween along the longitudinally extending edge of the saw blade opposite the cutting teeth so that the portion of the length of the saw blade clamped by said jaws is held rigid and the associated cutting teeth are exposed for cutting purposes and are held in proper alignment during use, and whereby rotation of said handle in the opposite direction will move said jaws away from said wedge member to release a saw blade positioned between said jaws.

5. A handsaw including a holder and an elongated saw blade having cutting teeth on a first longitudinally extending edge thereof, said holder comprising an elongated wedge member having longitudinally extending elongated wedging surfaces, a pair of elongated clamping jaws mounted adjacent to said wedge member for relative movement longitudinally thereof, said jaws having elongated bearing surfaces engaging said wedging surfaces and having spaced apart elongated clamping surfaces to engage and to grip between a substantial longitudinally extending portion of the saw blade along the longitudinally extending edge thereof opposite the first edge, a handle rotatably mounted on said wedge member and having an aperture therein to receive an end of the associated saw blade, said handle having a first thread section formed therein adjacent to said wedge member, said jaws having second thread sections extending into said handle and engaging said first thread section, and a keyway immovably formed in said wedge member to receive the blade therethrough and to prevent rotation thereof and of said jaws with respect to said wedge member upon rotation of said handle, rotation of said handle with respect to said wedge member in one direction moving said jaws into wedging engagement with said wedge member to clamp the saw blade therebetween along the longitudinally extending edge of the saw blade opposite the cutting teeth so that the portion of the length of the saw blade clamped by said jaws is held rigid and the associated cutting teeth are exposed for cutting purposes and are held in proper alignment during use, and whereby rotation of said handle in the opposite direction moving said jaws away from said wedge member to release the saw blade positioned therebetween.

References Cited in the file of this patent

UNITED STATES PATENTS

| | | |
|---|---|---|
| 303,478 | Wright | Aug. 12, 1884 |
| 2,482,385 | Urban et al. | Sept. 20, 1949 |
| 2,662,569 | Swalinkavich | Dec. 15, 1953 |

FOREIGN PATENTS

| | | |
|---|---|---|
| 132,733 | Sweden | Aug. 21, 1951 |

UNITED STATES PATENT OFFICE
CERTIFICATION OF CORRECTION

Patent No. 2,966,931　　　　　　　　　　　　　January 3, 1961

Raymond C. Dreier

It is hereby certified that error appears in the above numbered patent requiring correction and that the said Letters Patent should read as corrected below.

Column 5, line 45, for "blzade" read -- blade --; line 55, after "both" insert -- said --; column 7, line 2, for "between" read -- therebetween --.

Signed and sealed this 13th day of June 1961.

(SEAL)
Attest:

ERNEST W. SWIDER
Attesting Officer

DAVID L. LADD
Commissioner of Patents